(No Model.)
J. B. MARTINDALE.
CABLE ROADWAY.
No. 550,631.
Patented Dec. 3, 1895.
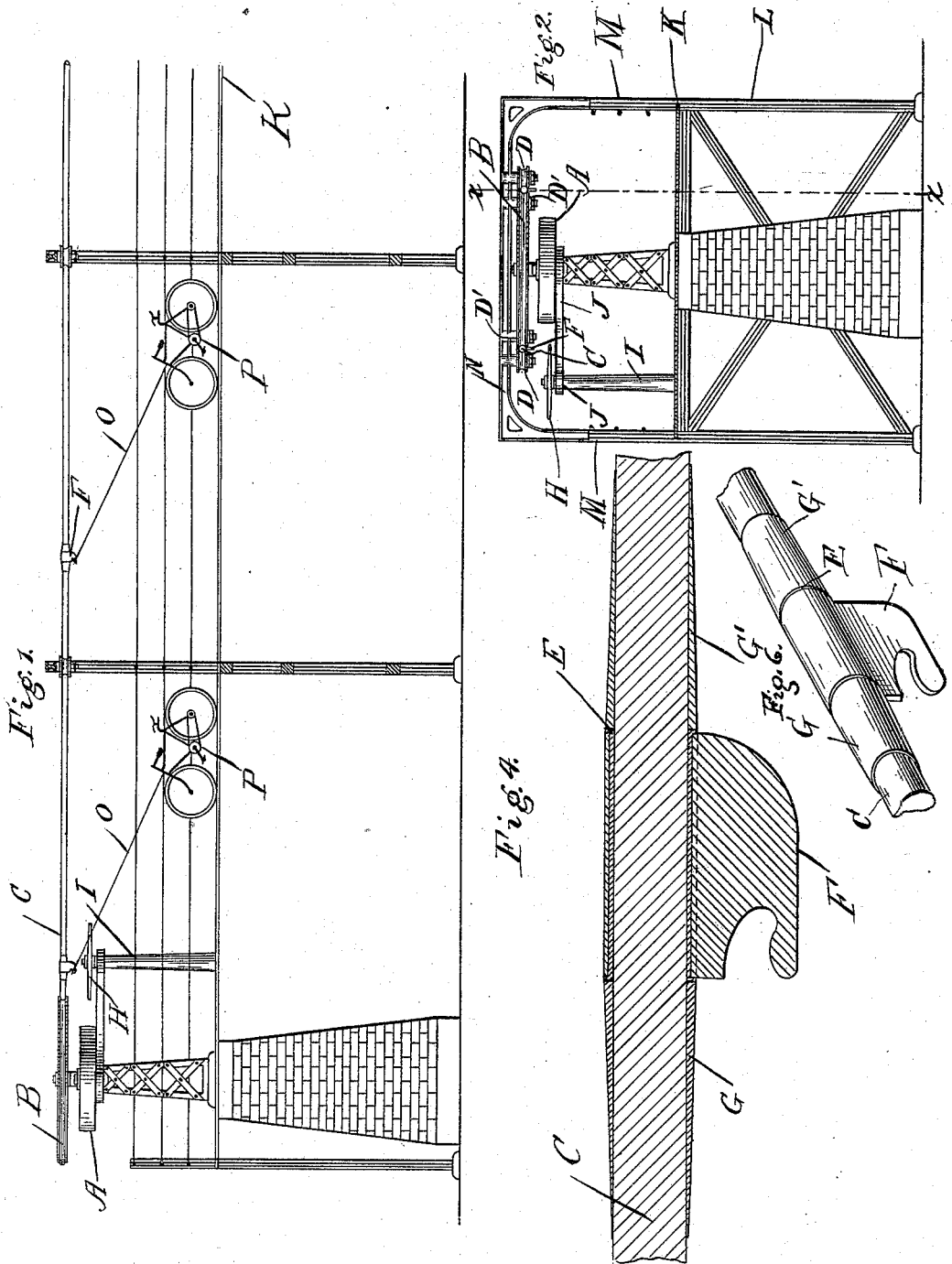
Witnesses:
Charles C. Burnap
W. B. Martindale
Inventor:
James B. Martindale (No Model.) J. B. MARTINDALE. 2 Sheets—Sheet 2.
CABLE ROADWAY.
No. 550,631. Patented Dec. 3, 1895.
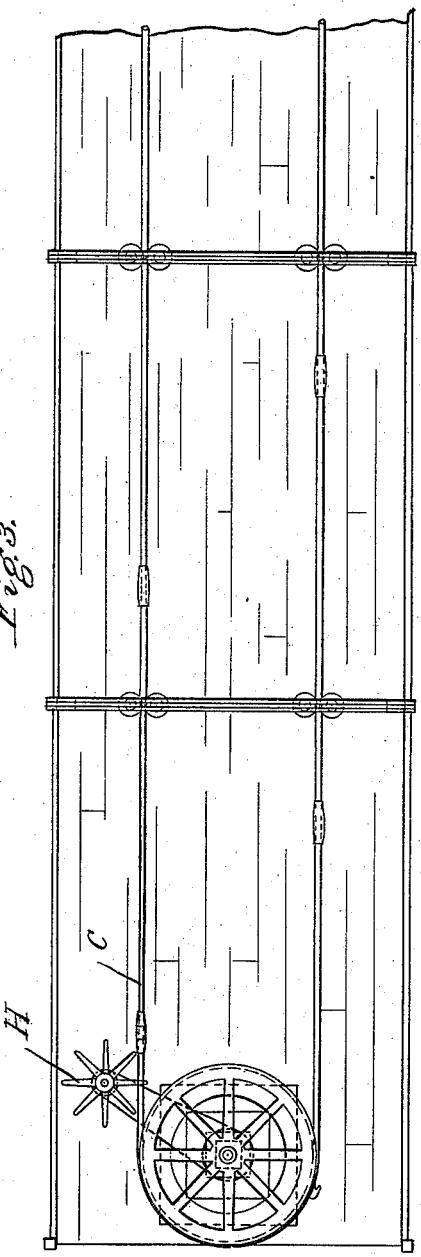
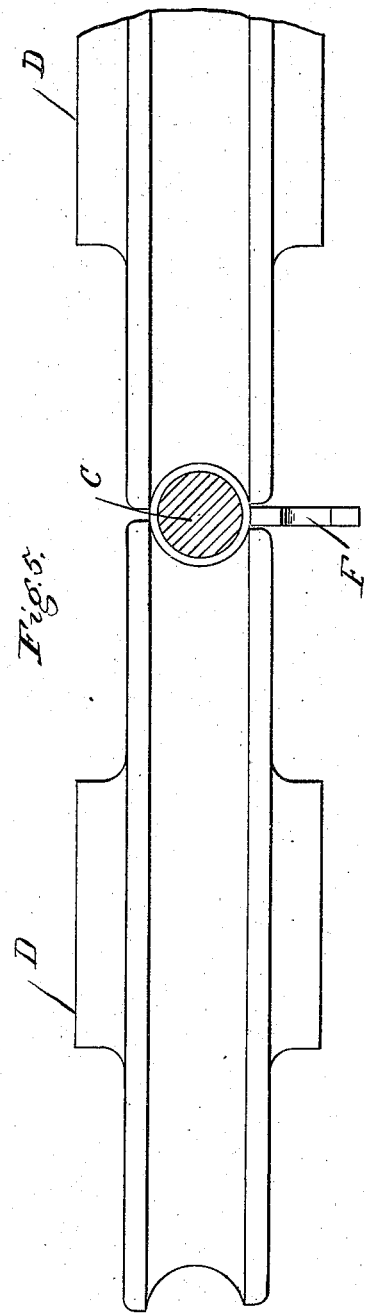
Witnesses:
Charles E. Burnap
W. B. Martindale
Inventor:
James B. Martindale

UNITED STATES PATENT OFFICE.

JAMES B. MARTINDALE, OF CHICAGO, ILLINOIS.

CABLE-ROADWAY.

SPECIFICATION forming part of Letters Patent No. 550,631, dated December 3, 1895.

Application filed July 29, 1895. Serial No. 557,404. (No model.)

*To all whom it may concern:*

Be it known that I, JAMES B. MARTINDALE, a citizen of the United States, residing at Chicago, in the county of Cook and State of Illinois, have invented certain new and useful Improvements in Cable-Roadways, of which the following is a specification.

My invention relates to improvements in means for propelling vehicles by a moving cable, in which the cable is suspended above the roadway in a parallel loop, and has for its object to provide a ready means for attaching and detaching any ordinary vehicle to or from said cable while in motion. I attain this object by the mechanism illustrated in the accompanying drawings, in which—

Figure 1 is a sectional side elevation of my improved cable-roadway in line $xx$ of Fig. 2. Fig. 2 is an end elevation of my improved cable-roadway, showing at A means for applying power to operate the cable. Fig. 3 is a top view of my improved cable-roadway. Fig. 4 is a sectional detail of cable, showing the hitching-hook (marked F) attached thereto; Fig. 5, a pair of pulley-wheels D D' and section of the cable C, showing the hitching-hook F at point of passing between the pulleys D D'; and Fig. 6 a perspective view of the hitching-hook F.

Similar letters refer to like parts in each of the figures.

A is a pulley mounted on a shaft, said shaft carrying also a large grooved pulley B.

C is the cable passing around the pulley B and between the small pulleys D D'.

E is a sleeve-shaped bushing surrounding the cable C and rigidly fastened to it, being provided at each end with flanges adapted to hold the sleeved hook F in place.

F is a sleeved hitching-hook, the sleeve fitting loosely around the bushing E to admit of its turning readily, so that the hook will always hang downward; G G', tapered covering surrounding the cable C on each side of the bushing E and hook F to prevent jar while the same is passing the pulleys D D'.

H is a hub provided with spokes and adapted to revolve immediately under the cable C, said spokes traveling in the same direction with the cable, but at a more rapid speed, in order to detach from the hook F all cords or other hitching devices before the hook passes around the pulley B.

I is a post supporting the hub H in position.

J is a belt passing around the pulley A and hub H.

K is a roadway, (here represented as elevated,) being supported by the frame L.

M M' are posts connected at the top by the truss N, forming a support for the pulleys D D', which hold the cable in position, the cord O and bicycle P showing a vehicle attached to said cable.

The operation of my improved cable-roadway is as follows: A power-belt being applied on the pulley A, causing the pulley B to revolve, will rotate the cable C in its circuit, and the hitching-hook F, hanging below the cable C, admits of any vehicle being hitched to the cable, whether the same be in motion or at rest, and the movement of the cable will propel such vehicle.

It is obvious that my improved cable-roadway is adapted for propelling any ordinary means of conveyance—such as wagons, buggies, sleighs, bicycles, tricycles, and other vehicles—without the necessity of rails being laid on the roadway, whereas all cable-roadways heretofore constructed require rails for the guidance of the vehicle propelled, the novelty of my invention consisting partly in placing the propelling-cable overhead and in means rigidly fixed to the cable for hitching vehicles to it.

What I claim as my invention, and desire to secure by Letters Patent, is—

1. A cable adapted to propel vehicles having rigidly fixed to it at intervals, a sleeve shaped bushing with flanged ends, carrying a sleeved hook loosely surrounding said bushing, substantially in the manner and for the purpose herein described.

2. In a propelling cable the combination of a wire cable, a sleeve shaped bushing made fast to said cable, a sleeved hook fitting loosely around said bushing and tapered flexible covering surrounding said cable at each side of said hook, substantially in the manner and for the purpose herein described.

3. In a cable roadway the combination of an overhead traveling cable, having rigidly fixed thereto a sleeve shaped bushing, adapted to receive a sleeved hook revolving readily on said bushing but traveling therewith, a detachable connection between said hook and a vehicle traveling on said roadway, substantially in the manner and for the purposes herein described.

4. In a cable roadway the combination of a roadway a cable forming a parallel loop above said roadway, means for attaching and detaching vehicles to and from said cable and a hub carrying spokes adapted to revolve in proximity to said cable and to detach therefrom any hitching devices remaining on said cable.

JAMES B. MARTINDALE.

In presence of—
GEO. B. MARTINDALE,
BARTON W. S. MARTINDALE.